United States Patent [19]

Newton et al.

[11] Patent Number: 4,493,785
[45] Date of Patent: Jan. 15, 1985

[54] ANTHRAQUINONE COMPOUNDS

[75] Inventors: David F. Newton, Oldham; David J. Thompson, Manchester, both of England

[73] Assignee: Imperial Chemical Industries PLC, London, England

[21] Appl. No.: 482,714

[22] Filed: Apr. 6, 1983

[30] Foreign Application Priority Data

Apr. 7, 1982 [GB] United Kingdom ............... 8210260
Aug. 18, 1982 [GB] United Kingdom ............... 8223726

[51] Int. Cl.$^3$ .......................... C09K 3/34; G02F 1/13; C07C 97/26; C07C 49/74
[52] U.S. Cl. ............................... 252/299.1; 260/378; 260/380; 260/383; 350/349
[58] Field of Search ................... 260/378, 380, 383; 252/299.1; 350/349

[56] References Cited

U.S. PATENT DOCUMENTS

| 4,232,950 | 11/1980 | Benham ............................ 252/299.1 |
| 4,363,743 | 12/1982 | Moeller et al. ................... 252/299.1 |
| 4,391,489 | 7/1983 | Harrison et al. ..................... 350/349 |
| 4,391,754 | 7/1983 | Renfrew ............................ 252/299.1 |

FOREIGN PATENT DOCUMENTS

| 26004 | 4/1981 | European Pat. Off. ......... 252/299.1 |
| 38460 | 10/1981 | European Pat. Off. ......... 252/299.1 |
| 44893 | 2/1982 | European Pat. Off. ......... 252/299.1 |
| 49036 | 4/1982 | European Pat. Off. ......... 252/299.1 |
| 2920730 | 11/1979 | Fed. Rep. of Germany ... 252/299.1 |
| 2037803 | 7/1980 | United Kingdom ............. 252/299.1 |
| 2081736 | 2/1982 | United Kingdom ............. 252/299.1 |

Primary Examiner—Teddy S. Gron
Attorney, Agent, or Firm—Cushman, Darby & Cushman

[57] ABSTRACT

New pleochroic anthraquinones, suitable for use in colored liquid crystal displays based upon the guest-host effect, of the formula:

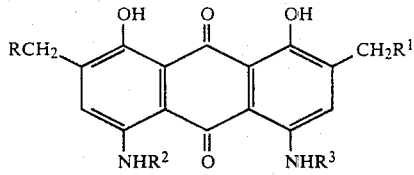

wherein
R & R$^1$, each independently, represents C$_{4-7}$-n-alkyl; and
R$^2$ & R$^3$, each independently, represents H or C$_{1-4}$-alkyl.

The invention also concerns processes for the preparation of the pleochroic compounds and some intermediate compounds.

8 Claims, No Drawings

ANTHRAQUINONE COMPOUNDS

This specification describes an invention relating to anthraquinone compounds having pleochroic properties and methods for their preparation.

It is known from UK patent application No. 2081736A that compound of the formula:

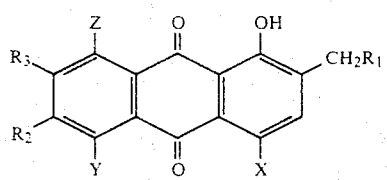   A wherein
- $R_1$ represents alkyl or aryl;
- X represents H, $NH_2$ or $NHCH_3$;
- one of Y and Z is OH and the other is H, $NH_2$ or $NHCH_3$ and
- one of $R_2$ and $R_3$ is H and the one that is ortho to the OH group is a $CH_2R_1$ group, have blue to green shades and pleochroic properties and are therefore suitable for the colouration of liquid crystal materials for use in electro-optic displays. It has now been found that certain compounds in accordance with Formula A have, in addition to high order parameters, unexpectedly high solubilities in liquid crystal materials. They are thus of especial value for use in high contrast, electro-optic displays based on the liquid crystal guest-host effect.

According to a first feature of the present invention there is provided a compound of the formula:

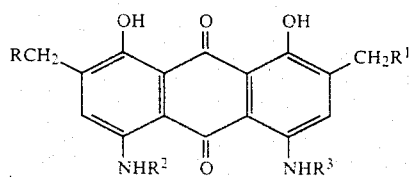   I wherein
- R & $R^1$, each independently, represents $C_{4-7}$-n-alkyl; and
- $R^2$ & $R^3$, each independently, represents H or $C_{1-4}$-alkyl.

A preferred compound according to Formula I is one in which the radicals represented by R and $R^1$ are the same and in an especially preferred compound both R and $R^1$ are n-butyl or n-hexyl. The latter compounds combine high solubility, high order parameter and good stability.

It is also preferred that the radicals represented by $R^2$ and $R^3$ are either both H or one is H and the other is $C_{1-4}$-alkyl. The compound in which both $R^2$ and $R^3$ are H generally has a higher order parameter than those in which one, or both, of $R^2$ and $R^3$ is $C_{1-4}$-alkyl, but the latter compounds, particularly where one, or both, of $R^2$ and $R^3$ is methyl, have absorption maxima at higher wavelengths and thus greener shades. These compounds of greener shade are especially suitable for mixture shades and particularly for the preparation of neutral black shades in admixture with the yellow and red pleochroic dyes described in UK Specification No. GB 2082196A and UK application No. 8203421 and the blue pleochroic dyes described in the present specification.

A useful indication of the ability of a dye to give good contrast is the product of the molar extinction coefficient and the solubility (in moles/liter). Solutions of dyes in liquid crystal compositions for use in electronic display applications preferably have a value for this product of at least 500 $cm^{-1}$ and more preferably at least 750 $cm^{-1}$. As the molar extinction coefficient for a dye does not vary significantly from one liquid crystal material to another, the preferred value of the product can be used to calculate the preferred minimum solubility of a particular dye in any liquid crystal material in order to give good contrast. Thus for a dye having a molar extinction coefficient of 10,000 $cm^2.moles^{-1}$ the solubility is preferably at least $5.0 \times 10^{-2}$ moles/liter and more preferably at least $7.5 \times 10^{-2}$ moles/liter. For a dye having a molar extinction coefficient of 15,000 $cm^2.moles^{-1}$ the solubility is preferably at least $3.3 \times 10^{-2}$ moles/liter and more preferably at least $5.0 \times 10^{-2}$ moles/liter. For a dye having a molar extinction coefficient of 20000 $cm^2.moles^{-1}$ the solubility is preferably at least $2.5 \times 10^{-2}$ moles/liter and more preferably at least $3.7 \times 10^{-2}$ moles/liter. The compounds of the present invention generally have high solubilities and high extinction coefficients.

Compounds for use in liquid crystal displays should preferably be as pure as possible in terms of their freedom from inorganic and other ionisable materials which can interfere with the operation of the display or products which are radiation sensitive and decompose within the display during operation. They should also preferably be free from non-pleochroic or inferior pleochroic materials, such as starting materials, intermediates and by-products, which do not contribute to the perceived contrast of the display. To obtain the compounds in a pure form, i.e. substantially free from interfering or deleterious matter, it is generally desirable to submit them to repeated recrystallisations from organics solvents, such as chloroform, and/or chromatographic separation procedures.

Where the compound according to the first feature of the invention is for use as in an electro-optical display, its addition to the liquid crystal material raises the viscosity of the latter and thus tends to increase the response time of the display. It is therefore desirable to use as little as possible, but sufficient to give an adequate electro-optical contrast. In this respect the compounds of Formula I are of particular value because many of them have high extinction coefficients and thus only small quantities, generally less 7%, by weight, are required in the liquid crystal material.

Although a guest-host device may require significantly less than 7% by weight of each dye compound incorporated in the liquid crystal material to operate at room temperature (20° C.) solubilities of dyes in liquid crystal materials diminish as the temperature falls and in order to obtain a reasonable solubility at lower temperatures the solubility at room temperature of each dye compound used may need to be about 7%, by weight, or even higher, e.g. up to 10% or more, by weight.

The compounds of Formula I exhibit high order parameter and solubility in a variety of liquid crystal host materials, including materials of both positive and negative dielectric anisotropy.

According to a further feature of the present invention there is provided a process for the preparation of a compound according to Formula I, wherein $R^2$ and $R^3$ are both hydrogen, which comprises nitrating a compound of the formula

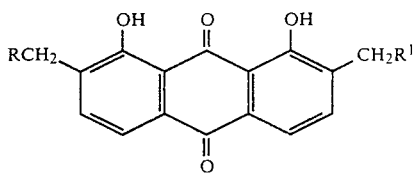

wherein R & $R^1$, each independently, represents $C_{4-7}$-n-alkyl, to give a 2,7-di-($C_{4-7}$-n-alkyl)-4,5-dinitrochrysazin and reducing the 2,7-di-($C_{4-7}$-n-alkyl)-4,5-dinitrochrysazin to a 2,7-di-($C_{4-7}$-n-alkyl)-4,5-diaminochrysazin.

The two stages of this reaction, i.e. nitration and reduction, may be carried out using conventional reagents. For example, nitration may be performed using a mixture of concentrated nitric and sulphuric acids and reduction may be performed using a mixed sulphur/sodium sulphide reducing agent.

A compound of Formula I in which $R^2$ and/or $R^3$ are alkyl can be prepared by alkylation of the compound in which $R^2$ and $R^3$ are hydrogen, e.g. by reaction with a $C_{1-4}$-alkanol in the presence of boric acid and concentrated sulphuric acid. In this way a $C_{1-4}$-alkyl group may be introduced into one or both of the amino groups. This alkylation generally leads to a mixture of compounds containing no, one or two $C_{1-4}$-alkyl groups which may be used at such or separated into is components by chromatography and/or fractional crystallisation. The shade of the mixture may be adjusted by blending with other pleochroic dyes.

The intermediate compound of Formula II, wherein R and $R^1$ each independently represents $C_{4-7}$-n-alkyl, is novel and forms a further feature of the present invention. The preparation of this intermediate compound, which forms a further feature of the present invention, comprises the reaction of chrysazin or leuco-chrysazin with one or more aldehydes of the formula RCHO and $R^1$CHO, wherein R and $R^1$ are $C_{4-7}$-n-alkyl, in the presence of pyridine.

This alkylation reaction is preferably performed with leuco-chrysazin which may be prepared in situ by reduction of chrysazin with alkaline dithionite. The reaction medium is preferably aqueous pyridine, especially comprising from 10:1 to 1:1, by weight, water:pyridine. It is surprising that this reaction proceeds so effectively with n-alkyl aldehydes because, in the absence of pyridine, n-alkyl aldehydes generally undergo an aldol condensation which competes with the desired alkylation and reduces the yield of the intermediate 2,7-dialkylchrysazin. This alkylation may be performed at a temperature from 20° C. to 100° C., especially from 50° C. to 90° C., for a period of from 1 to 24 hours, preferably from 2 to 8 hours. Where a mixture of two different aldehydes is used the product will comprise a mixture of two symmetrical compounds of Formula II in which R and $R^1$ are the same and one unsymmetrical compound of Formula II in which R and $R^1$ are different. If desired, the components may be separated from the mixture by chromatography before conversion into a compound of Formula I or the mixture may be converted directly into a mixture of compounds according to Formula I. For the preferred product, in which the radicals R and $R^1$ are identical, at least two, and preferably up to about three, moles of an aldehyde, RCHO, in which R is $C_{4-7}$-n-alkyl, may be used for each mole of chrysazin. For the product in which R and $R^1$ are different from 1 to 1.5 moles of each aldehyde may be used for each mole of chrysazin.

The compound of Formula I is unexpectedly superior to the homologous compounds in which R and $R^1$ are lower ($<C_4$) or higher ($>C_7$) alkyl radicals and the isomeric compound in which R and $R^1$ are branched chain $C_{4-7}$-alkyl. It is also unexpectedly superior to the isomeric anthrarufin derivative, in which the OH groups are in the 1 and 5 positions, the —$NHR^2$ and —$NHR^3$ groups are in the 4 and 8 positions and the —$CH_2R$ and —$CH_2R^1$ groups are in the 2 and 6 positions on the anthraquinone nucleus.

The invention is further illustrated by the following Examples in which all parts and percentages are by weight unless otherwise indicated.

EXAMPLE 1

(a) Preparation of 2,7-Di-n-pentylchrysazin

Chrysazin (120 g) was stirred into a solution of 120 g of sodium hydroxide in a mixture of water (1500 ml) and pyridine (220 ml) at 55° C. Sodium hydrosulphite (200 g) was added to the mixture which was stirred under $N_2$ for 30 minutes before addition of a further 100 g of sodium hydrosulphite. To this reaction mixture was added, dropwise over a period of 30 minutes, n-pentanal (142 g) and the mixture stirred for 2 hours at 80° C. still under $N_2$. The mixture was then cooled to room temperature, poured into an acidified ice/water mixture (ice/water: 4 liters and 35% HCl: 700 ml), in which it was stirred for 2 hours, filtered and the filter cake washed with water. The tarry cake was slurried in 400 ml of ethyl acetate, filtered, washed with methanol and pulled until damp-dry. This paste was recrystallized from ethyl acetate to give 56 g of dry product (yield 29.5%) melting at 127° C. Elemental analysis gave C=76.1% (75.8%) and H=7.5% (7.4%).

(b) Preparation of 2,7-Di-n-pentyl-4,5-dinitrochrysazin 2,7-Dipentylchrysazin (56 g) was stirred in 800 ml of 98% sulphuric acid at room temperature for 30 minutes and then cooled to 0° C. To the cooled mixture was added, dropwise over a period of 30 minutes, whilst maintaining the temperature <10° C., 160 ml of of an anhydrous nitration acid, comprising 33% nitric acid and 67% sulphuric acid, and the mixture stirred for 2 hours at <10° C. The mixture was then poured into 4 liters of ice/water, stirred at room temperature for 30 minutes, filtered, washed acid-free and dried to give 50.5 g (yield 73%) of dry product melting at 140° C. Elemental analysis gave C=58.8% (61.3%), H=5.4% (5.5%) and N=5.5% (6.0%)

(c) Preparation of 2,7-Di-n-pentyl-4,5-diamino-chrysazin (1c)

2,7-Di-n-pentyl-4,5-dinitrochrysazin (6 g) was stirred into a mixture of 200 ml water and 50 ml pyridine at 20° C. To this mixture was added a mixed sulphur/sulphide reduction liquor, containing 25 g sodium sulphide and 3 g sulphur in 20 ml water, and the mixture stirred at 90° C. until reaction was complete (1 hour). After a further period of 30 minutes at 90° C. the mixture was filtered hot and the cake was washed sequentially with water and methanol and dried to give 4.6 g dry product (1c: yield 88.4%) melting at 164°–7° C.

EXAMPLE 2

(a) Preparation of 2,7-Di-n-heptyl-chrysazin

The process of Example 1(a) was repeated except for the replacement of the 142 g of of n-pentanal with 171 g of n-heptanal. The quantity of dry product was 103g (yield 47.6%) which melted at 116°–118° C. Elemental analysis gave C=76.1% (75.8%) and H=7.5% (7.4%).

(b) Preparation of 2,7-Di-n-heptyl-4,5-dinitrochrysazin

The process of Example 1(b) was repeated using 87.2 g of 2,7-di-n-heptylchrysazin in place of the 56 g of 2,7-di-n-pentylchrysazin and increasing the quantity of the other ingredients by 25%. The quantity of dry product was 50.5 g (yield 69.1%) melting at 140° C. Elemental analysis gave C=58.8% (61.3%), H=5.4% (5.5%) and N=5.5% (6.0%).

(c) Preparation of 2,7-Di-n-heptyl-4,5-diaminochrysazin (2c)

The procedure of Example 1(c) was repeated using 27 g of 2,7-di-n-heptyl-4,5-dinitrochrysazin in place of the 6g of 2,7-di-n-pentyl-4,5-dintrochrysazin and increasing the volume of water pyridine to 1 liter in the same proportions. The reduction liquor comprised 100 g sodium sulphide and 12 g of sulphur in 50 ml water. The quantity of product (2c) after recrystallisation from toluene was 20.9 g (yield 88.2%) melting at 140°–2° C. Elemental analysis gave C=72.4 (72.1), H=8.5 (8.2) and N=6.0 (6.0).

EXAMPLE 3

2,7-Di-n-hexyl-4,5-diaminochrysazin was made using the process of Example 1, but using the equivalent quantity of n-hexanal in place of the n-pentanal. The product (3) melted at 138°–9° C. and the elemental analysis gave C=71.3 (71.2) H=7.8 (7.8) and N=5.9 (6.4). The structure was confirmed by NMR and mass spectral analyses and the purity by HPLC.

EXAMPLE 4

2,7-di-n-octyl-4,5-diaminochrysazin was prepared by the process of Example 1 but using the equivalent quantity of n-octanal in place of the n-pentanal. The product (4) melted at 112°–4° C., the structure was confirmed by mass spectral and NMR analyses and the purity by HPLC.

EXAMPLE 5

(a) Preparation of Partially Methylated 2,7-Di-n-heptyl-4,5 diaminochrysazin Boric acid (2.5 g) was stirred in 98% sulphuric acid (44 ml) at 20° C. for 30 minutes. To this mixture was added 2,7-di-n-heptyl-4,5-diaminochrysazin (2c:8.63 g) and the whole stirred for a further 1 hour at 20° C. A mixture of water (5 g) and methanol (7.5 g) was added dropwise over 10 minutes and the mixture heated to 115° C. After 3 hours at 115° C. the temperature was raised to 120° C. and stirred at 120±5° C. for 16 hours. The reaction mixture was then cooled to 20° C., drowned into a mixture of ice and water, filtered and the solid washed acid free and dried (yield 8.15 g). The dried product was reslurried in pyridine (80 ml) at 60° C., diluted with water (40 ml), cooled to 20° C., filtered, washed with water and dried (yield 7.3 g). It was finally extracted with 100–120 petroleum ether to yield 1.6 g of a solvent-soluble partially methylated derivative (5a) containing 2,7-di-n-heptyl-4,5-diaminochrysazin, 2,7-di-n-heptyl-4-amino-5-methylamino-chrysazin and 2,7-di-n-heptyl-4,5-di(methylamino)chrysazin.

(b) Preparation of 2,7-di-n-heptyl-4-amino-5-methylaminochrysazin

(c) Preparation of 2,7-di-n-heptyl-4,5-di(methylamino)chrysazin

The solvent soluble partially methylated derivative from Example 5(a) above was dissolved in toluene and passed down a silica gel column eluting firstly with toluene to achieve separation and then with 90:10 toluene:chloroform to speed recovery. The fractions containing the two main products were evaporated to dryness and separately slurried in 40-60 petroleum ether, filtered and dried. The structure of the product from the first fraction was confirmed by mass spectrometry as 2,7-di-n-heptyl-4,5-di(methylamino)chrysazin (5c), having an extinction coefficient of 22,100 at 575 nm. The structure of the product from the second fraction was confirmed by mass spectrometry as 2,7-di-n-heptyl-4-amino-5-methylaminochrysazin (5b), melting at 110°–2° C. and having an extinction coefficient of 19,522 at 675 nm.

EXAMPLE 6

The equivalent derivatives of 2,7-di-n-pentyl-4,5-diaminochrysazin (1c) were prepared by the method of Example 5 using the equivalent amount of 2,7-di-n-pentyl-4,5-diaminochrysazin (1c) in place of the 2,7-di-n-heptyl-4,5-diaminochrysazin (2c). The mixture of unmethylated and partially and fully methylated derivative (6a) was separated using the same method as Example 5. The monomethylated derivative (6b) had a melting point at 142°–5° C. and extinction coefficient of 23,785 at 675 nm. The dimethylated derivative (6c) had a melting point at 158°–60° C.

EXAMPLE 7

2,7-Di-n-pentyl-4,5-diaminochrysazin (1c:11.74 g) was stirred in 98% sulphuric acid (32.6 ml) at 20° C. for 30 minutes. To this mixture was added dimethyl sulphate (14.1 ml) and the whole stirred at 150°–5° C. for 12.5 hours, during which a further 7.05 ml of dimethyl sulphate was added after 3 hours. The reaction mixture was then drowned into ice/water and the product filtered, washed acid free with water and dried (yield: 11.9 g).

The crude product was slurried in pyridine (220 ml) at 60° C., diluted with water (110 ml), cooled to 20° C., filtered, washed successively with 50/50 pyridine/water (20 ml) and water and dried (yield: 10.6 g).

The pyridine treated material was continuously extracted with 100–120 petroleum (200 ml) and ethyl acetate (50 ml) leaving 5.6 g of insoluble material. The solvent extracts (containing soluble material) were evaporated to dryness, washed with 40-60 petroleum, filtered and dried to yield 4.3g of purified material (7a).

A blend was prepared by dissolving 4.2 g of 7a and 1.26 g of 2,7-di-n-pentyl-4,5-diaminochrysazin (1c) in chloroform, evaporating to dryness and grinding the dry mixture in 40–60 petroleum until the solvent evaporated leaving 5.3 g of fine powder (7b).

EXAMPLE 8

2,7-Di-n-pentyl-4,5-diaminochrysazin (1c:10.25 g) was added to a mixture of 98% sulphuric acid (250 g)

and water (250 g) at 20° C. and the mixture heated to 80°–5° C. Formaldehyde solution (37%:4 ml) was added in 0.5 ml portions at 30 minute intervals and the temperature maintained at 80°–5° C. for a further 3 hours. The reaction mixture was then cooled to 20° C. and drowned into ice/water (2l). The product was filtered, washed acid-free with water and dried to yield 10 g of product (8).

HPLC analysis of the Products 7a, 7b and 8 shows them to have the following compositions:

| Product | (%) in Product of | | | λmax (nm) |
|---------|---|---|---|---|
| | 1c | 6b | 6c | |
| 7a | 19 | 51 | 30 | 638 |
| 7b | 38 | 37 | 25 | 624 |
| 8 | 44 | 46 | 10 | * |

EXAMPLE 9

A black mixture dye was made by mixing together 8 parts of Dye 1(c) (blue), 15 parts of 2,7-di-n-heptyl-4-phenylthio-5-(4-t-butylphenylthio)chrysazin (violet), which is the product of Example 5(d) in our co-pending UK patent application No. 8223718 filed 18 Aug.1982 and 20 parts of 1-phenylthio-5-(4-t-butylphenylthio)anthraquinone (yellow) which is the product of Example 11 in UK Patent Specification No. 2094822A.

EXAMPLE 10

A black mixture dye was prepared using the same dyes as in Example 7, by mixing 12 parts of the blue dye, 20 parts of the violet dye and 30 parts of the yellow dye.

EXAMPLE 11

A black mixture was made by mixing together 10 parts of Dye 1(c) (blue), 10 parts of the violet dye used in Example 9, 20 parts of the yellow dye used in Example 9, 30 parts of 1,5-di(4-t-butylphenylthio)-4-phenylthioanthraquinone (orange) which is the product of Example 22 in UK Patent Specification No. 2094822A and 10 parts Dye 5(a) (blue-green), i.e. the partially methylated derivative of the blue dye used in Example 9 above.

Comparative dyes, with longer, shorter or branched alkyl chains or in accordance with Formula B, were made by equivalent processes, starting with the appropriate alkanal in place of the $C_{5-8}$-n-alkanal used in the Examples and/or anthrarufin in place of the chrysazin used in the Examples.

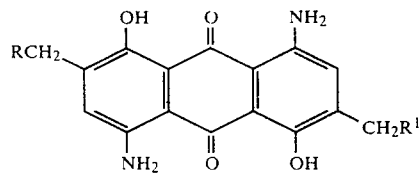

B

All products were recrystallised from petroleum ether or toluene until their purity exceeded 95% and their properties were assessed in various liquid crystal materials. The properties of the compounds of Formula I in typical liquid crystal materials are given in the following tables in comparison with some branched chain isomers, some lower and higher homologues and with some equivalent compounds in accordance with Formula B.

TABLE I

Compounds of Formulae I & B in which $R = R^1$ and $R^2 = R^3 = H$

| R & $R^1$ | Order Parameter (S) | Solubility (wt %) | Stability |
|---|---|---|---|
| Examples (Formula I) | | | |
| n-butyl (1c) | 0.77 | 8.0 | 100 hr 97% |
| | | | 2000 hr 73% |
| n-pentyl (3) | 0.76 | 4.3 | * |
| n-hexyl (2c) | 0.78 | 5.5 | 400 hr 92% |
| | | | 2000 hr 87% |
| n-heptyl (4) | 0.73 | 13.0 | * |
| Comparative Dyes (Formula I) | | | |
| iso-propyl | 0.72 | 1.6 | 400 hr 92% |
| | | | 1500 hr 85% |
| —CH($C_2H_5$)$_2$ | 0.66 | * | * |
| —CH($CH_3$)$CH_2CH_3$ | 0.68 | * | * |
| —$C_2H_4$CH($CH_3$)$CH_2$C($CH_3$)$_3$ | 0.71 | 1.6 | * |
| n-octyl | 0.77 | 2.4 | * |
| n-nonyl | 0.76 | 1.0 | * |
| n-unadecyl | 0.80 | 0.3 | * |
| Comparative Dyes (Formula B) | | | |
| iso-propyl | 0.69 | <2.0 | * |
| n-butyl | 0.76 | <0.1 | * |
| n-pentyl | 0.74 | <1.0 | * |
| n-hexyl | * | <0.01 | * |
| n-heptyl | 0.73 | <2.0 | * |

TABLE II

Compounds of Formula I in which $R = R^1$, $R^2$ is methyl and $R^3$ is H

| R & $R^1$ | Order Parameter (S) | Solubility (wt %) | Stability |
|---|---|---|---|
| Examples | | | |
| n-butyl (6b) | 0.72 | 3.3 | * |
| n-hexyl (5b) | 0.68 | 0.5 | * |
| Comparative Dye | | | |
| iso-propyl | 0.63 | * | * |

TABLE III

Compounds of Formula I in which $R = R^1$, $R^2 = R^3 = $ methyl

| R & $R^1$ | Order Parameter (S) | Solubility (wt %) | Stability |
|---|---|---|---|
| Examples | | | |
| n-butyl (6c) | 0.66 | 0.9 | * |
| n-hexyl (5c) | 0.67 | 0.5 | * |
| Comparative Dye | | | |
| iso-propyl | 0.54 | * | * |

TABLE IV

Mixtures of Compounds of Formula I in which $R = R^1$ and $R^2 = R^3 = H$, $R^2 = R^3 = $ methyl and $R^2 = H$ and $R^3 = $ methyl

| R & $R^1$ | Order Parameter (S) | Solubility (wt %) | Stability |
|---|---|---|---|
| Examples | | | |
| n-butyl (6a) | 0.74 | 8.7 | * |
| n-hexyl (5a) | 0.77 | 3.4 | * |
| Comparative Dye | | | |
| iso-propyl | 0.63 | * | * |

TABLE V

Compounds of Formula I in which $R = R^1$ and $R^2 = R^3 = H$ in other Liquid Crystal Material

| | Liquid Crystal Material | | | | | |
|---|---|---|---|---|---|---|
| | 1132 | | 1695 | | FBCO Ester | |
| R & $R^1$ | S | Sol | S | Sol | S | Sol |
| n-butyl (1c) | 0.77 | 10.0 | 0.79 | 6.5 | 0.69 | 3 |
| n-hexyl (2c) | 0.78 | 7.0 | 0.80 | * | 0.70 | 3 |
| Comparative Dye | | | | | | |
| iso-propyl | 0.73 | 3.0 | 0.79 | * | 0.62 | 1 |

NOTES ON TABLES I TO V (i) Order parameters, solubilities and stabilities reported in Tables I to V were measured in the liquid crystal material, E 43, which is referred to as Host B in UK Specification No. 2081736A and is available from BDH Ltd of Poole, Dorset. Measurements were made at 20° C. unless otherwise indicated.

(ii) Stabilities were measured as the percentage decrease in absorption at the absorption maximum after the indicated period of irradiation with a 1 kW phosphor-coated, mercury vapour lamp at 30° C.

(iii) The liquid crystal materials in Table V are:

ZLI 1132: Host C of UK Specification No. 2081736A;

ZLI 1695: Available from E. Merck Co, Darmstadt, W. Germany;

FBCO Ester: Host 12 of UK application No. 8205153.

(iv) In Table V "S" means order parameter and "Sol" means solubility (wt %) in the appropriate liquid crystal material.

(iv) *indicates that the property was not measured.

We claim:

1. A compound of the formula:

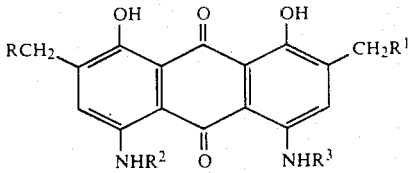

wherein
R & $R^1$, each independently, represents $C_{4-7}$-n-alkyl; and
$R^2$ & $R^3$, each independently, represents H or $C_{1-4}$-alkyl.

2. A compound according to claim 1 wherein R and $R^1$ are the same.

3. A compound according to claim 2 wherein both R and $R^1$ represent n-butyl or n-hexyl and both $R^2$ and $R^3$ represent H.

4. A compound according to claim 1 or claim 2 wherein at least one of $R^2$ and $R^3$ represents $C_{1-4}$-alkyl.

5. A compound according to claim 2 wherein both R and $R^1$ represent n-butyl or n-hexyl, $R^2$ is H and $R^3$ is $C_{1-4}$-alkyl.

6. A mixture of pleochroic dyes containing a compound according to claim 5.

7. A compound according to anyone of claims 1, 2, and 4 to 6 wherein each $C_{1-4}$-alkyl group represented by $R^2$ and $R^3$ is methyl.

8. A mixture of pleochroic dyes containing a first compound according to claim 1 in which both R and $R^1$ represent n-butyl or n-hexyl and both $R^2$ and $R^3$ represent H, a second compound according to claim 1 in which both R and $R^1$ represent n-butyl or n-hexyl and $R^2$ and $R^3$ represent $C_{1-4}$-alkyl and a third compound according to claim 1 in which both R and $R^1$ represent n-butyl or n-hexyl, $R^2$ represents H and $R^3$ represents $C_{1-4}$ alkyl.

* * * * *